United States Patent
White et al.

(10) Patent No.: US 7,000,009 B2
(45) Date of Patent: Feb. 14, 2006

(54) SYSTEM AND METHOD FOR USING REMOTE LINKS FOR PROCESSING DOCUMENT DATA

(75) Inventors: Craig R. White, Eagle, ID (US); Binnur Al-Kazily, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 778 days.

(21) Appl. No.: 09/874,193

(22) Filed: Jun. 4, 2001

(65) Prior Publication Data

US 2002/0194258 A1    Dec. 19, 2002

(51) Int. Cl.
 *G06F 15/16*   (2006.01)
(52) U.S. Cl. ............... 709/219; 709/202; 709/203; 709/206; 709/217; 709/218

(58) Field of Classification Search ............... 709/202, 709/203, 206, 217, 218, 230, 219; 707/100, 707/200; 718/107; 715/500; 382/138
See application file for complete search history.

(56) References Cited

U.S. PATENT DOCUMENTS

| 5,359,667 A | * | 10/1994 | Borowski et al. ........... 382/138 |
| 5,421,015 A | * | 5/1995 | Khoyi et al. ................ 718/107 |
| 5,737,619 A | * | 4/1998 | Judson ........................ 715/500 |
| 6,016,492 A | * | 1/2000 | Saxton et al. ............... 707/100 |

* cited by examiner

*Primary Examiner*—Ario Etienne
*Assistant Examiner*—Yves Dalencourt

(57) ABSTRACT

Systems and methods for providing processing operations on documents by external processing routines are provided. A representative system includes a processing link identifier that identifies a document containing at least one processing link to the external processing code. An invoker is used to invoke a processing engine that modifies the document using the external processing routine. A representative method operates by acquiring a processing link in the document and using the processing link to invoke a processing engine. The processing engine is then used to modify the document.

12 Claims, 6 Drawing Sheets

FIG. 4B ly, documents are processed with a specific application that
SYSTEM AND METHOD FOR USING REMOTE LINKS FOR PROCESSING DOCUMENT DATA

FIELD OF THE INVENTION

The present invention generally relates to computer software, and more particularly, to a system and method for using remote links for processing document data.

DESCRIPTION OF RELATED ART

Typically, today's computing and networking environments are complex and geographically distributed, and in the future they will be even more so. However, typical
resides on only one computer. Since the document application resides on a single computer, it is therefore limited in the ability to process the document using procedures and/or functions outside the document application. These functions and procedures typically operate on processing codes (usually hidden) within a document. These processing codes can be representative of document text formats, document text fonts, document tabs and tab rulers, document tables, document printing information, document comments, document headers and footers, document page numbers, document horizontal and vertical alignment data, and the like.

By way of example, consider a word processing application such as Microsoft Word. The appearance and formatting of text may be controlled by processing codes inserted into the document. Since the processing routines (i.e., the routines that interpret the processing scales and act upon them) are a part of the word processor, the ability to update or expand a suite of functions is very limited. Specifically, updates and expansions require an upgrade to the word processing software (either by installing a new version or a "plug-in").

A significant shortcoming in such systems is the inability of a processing code to be shared across multiple applications. For example, if the same function is desired in multiple applications, then each application must be separately upgraded.

Thus, a heretofore-unaddressed need exists in the industry to address the aforementioned deficiencies and inadequacies.

SUMMARY OF THE INVENTION

The present invention provides a system and method for performing processing operations on a document by a remote application. Specifically, in a computing system having a document that is to be read, processed, or otherwise operated upon by a first application program, the present invention provides the ability for functions or procedures remote from the application program to operate upon the document, in response to processing links embedded within the document. It will be appreciated that the invention allows feature upgrades for documents without having to upgrade a corresponding application program.

Briefly described, in architecture, the system of the preferred embodiment can be implemented as follows. The system includes a processing link identifier that identifies a document containing at least one processing link to the external processing code. An invoker is used to invoke a processing engine that modifies the document using the external processing code.

The present invention can also be viewed as providing a method for providing references to external processing codes that can operate on the document. In this regard, the preferred method can be broadly summarized by the following steps. The method operates by: 1) acquiring a processing link in the document; 2) using the processing link to invoke a processing engine; and 3) modifying the document by said processing engine.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The accompanying drawings incorporated in and forming a part of the specification illustrate several aspects of the present invention, and together with the description, serve to explain the principles of the invention. Moreover, in the drawings, like reference numerals designate corresponding parts throughout the several views. In the drawings.

DETAILED DESCRIPTION OF THE PREFERRED EMBODIMENT

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 1:
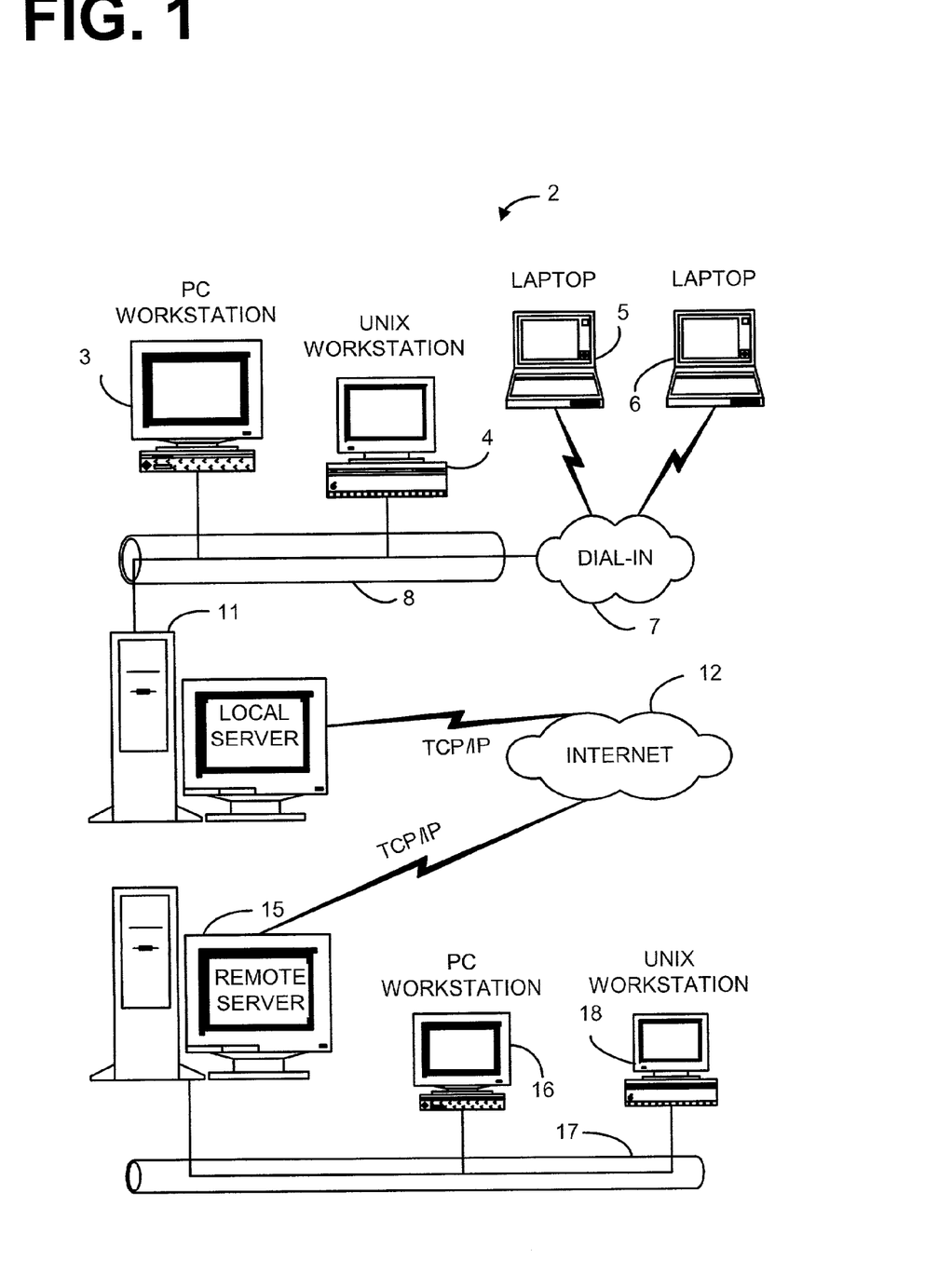
FIG. 1 is a block diagram illustrating an example of an architecture of local and remote clients, and local and remote server systems, in a networked computing environment.

Turning now to the drawings, FIG. 1 is a block diagram illustrating an example of the architecture of local and remote clients, and local and remote server systems. This exemplar configuration illustrates the flexibility, expandability, and platform independence of the present invention. While the system configuration 2 could take many forms, the diagram of FIG. 1 illustrates a plurality of diverse computers 3 and 4 connected to a network 8. Additional computers 5 and 6 may similarly be remotely located and in communication with the network 8 through a dial-in network 7 or other network connection. Additional computers 16 and 18 may similarly be located and in communication with the remote network server 15 for access to data on the local network server 11 and the remote network server 15. Computers 16 and 18 communicate with the remote network server 15 over a network 17. Each of the computers in FIG. 1 is uniquely illustrated to emphasize that clients may comprise a diverse hardware platform.

Networks 8 and 17 may be, for example, but not limited to, a dial-in network, LAN, WAN, PSTN, Intranet, Internet and Ethernet type networks, also known as 10 BASE 2, 10 BASE 5, 10 BSAEF, 10 BASET, BASE BAN network, and the like. The local network server 15 and computers 3–6, connected to the local network server 11, may communicate with the remote network server 15, and computers 16 and 18 over a network 12. Network 12 may be, for example, but not limited to, a LAN, WAN, Ethernet, PSTN, Intranet/Internet communication links, or the like.

Figure 2:
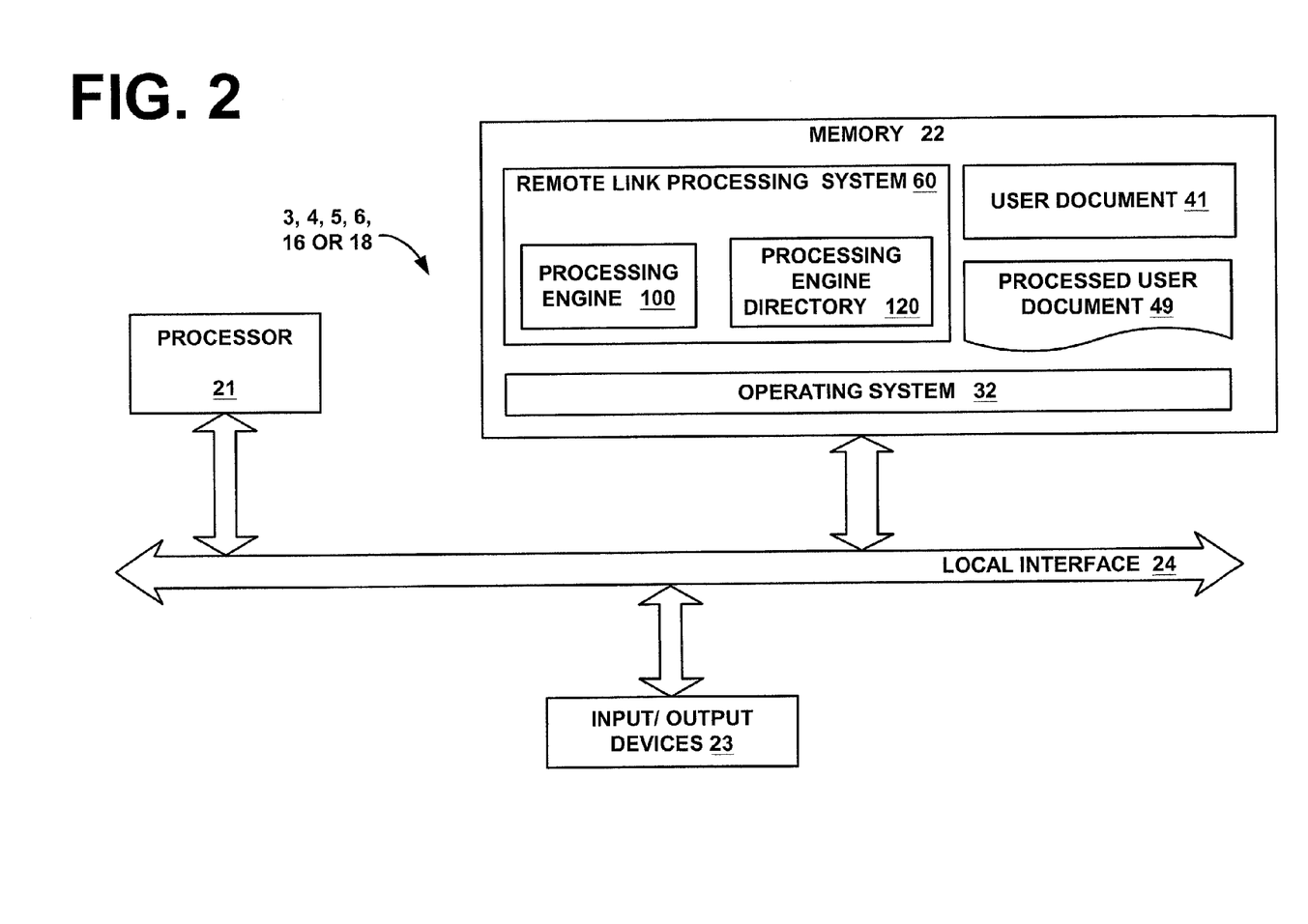
FIG. 2 is a block diagram illustrating an example of a computer system utilizing an operating system, client application, and remote link processing system of the present invention.

An example of a general-purpose computer that can implement the remote link processing system of the present invention is shown in FIG. 2. The remote link processing system, denoted by reference numeral 60, includes a processing engine denoted by reference numeral 100, and a processing engine directory denoted by reference numeral 120. The remote link processing system 60 of the invention can be implemented in software (e.g., firmware), hardware, or a combination thereof. In one embodiment, the remote link processing system 60 is implemented in software, as an executable program, and is executed by a special or general purpose digital computer, such as a personal computer (PC; IBM-compatible, Apple-compatible, or otherwise), workstation, minicomputer, personal digital assistant (PDA) or mainframe computer.

Generally, in terms of hardware architecture, as shown in FIG. 2, the computers 3–6, 16 and/or 18 include a processor 21, memory 22, and one or more input and/or output (I/O) devices 23 (or peripherals) that are communicatively coupled via a local interface 24. The local interface 24 can be, for example but not limited to, one or more buses or other wired or wireless connections, as is known in the art. The local interface 24 may have additional elements, which are omitted for simplicity, such as controllers, buffers (caches), drivers, repeaters, and receivers, to enable communications. Further, the local interface 24 may include address, control, and/or data connections to enable appropriate communications among the aforementioned components.

The processor 21 is a hardware device for executing software that can be stored in memory 22. The processor 21 can be virtually any custom made or commercially available processor, a central processing unit (CPU) or an auxiliary processor among several processors associated with the computer 3–6, 16 and/or 18, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 22 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 22 may incorporate electronic, magnetic, optical, and/or other types of storage media. Note that the memory 22 can have a distributed architecture, where various components are situated remote from one another, but can be accessed by the processor 21.

The software in memory 22 may include one or more separate programs, each of which comprises an ordered listing of executable instructions for implementing logical functions. In the example of FIG. 2, the software in the memory 22 includes the Remote link processing system 60 and a suitable operating system (O/S) 32.

A non-exhaustive list of examples of suitable commercially available operating systems 32 is as follows: a Windows operating system from Microsoft Corporation, U.S.A., a Netware operating system available from Novell, Inc., U.S.A., an operating system available from IBM, Inc., U.S.A., any LINUX operating system available from many vendors or a UNIX operating system, which is available for purchase from many vendors, such as Hewlett-Packard Company, U.S.A., Sun Microsystems, Inc. and AT&T Corporation, U.S.A. The operating system 32 essentially controls the execution of other computer programs, such as the remote link processing system 60, and provides scheduling, input-output control, file and data management, memory management, and communication control and related services.

The processing engine 100 in the remote link processing system 60 may be a source program, executable program (object code), script, or any other entity comprising a set of instructions to be performed. When a source program, then the program is usually translated via a compiler, assembler, interpreter, or the like, which may or may not be included within the memory 22, so as to operate properly in connection with the O/S 32. Furthermore, the processing engine 100 in the remote link processing system 60 can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, and Ada.

The I/O devices 23 may include input devices, for example but not limited to, a keyboard, mouse, scanner, microphone, etc. Furthermore, the I/O devices 23 may also include output devices, for example but not limited to, a printer, display, etc. Finally, the I/O devices 23 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 3–6, 16 and/or 18, is a PC, workstation, or the like, the software in the memory 22 may further include a basic input output system (BIOS) (omitted for simplicity). The BIOS is a set of essential software routines that initialize and test hardware at startup, start the O/S 32, and support the transfer of data among the hardware devices. The BIOS is stored in ROM so that the BIOS can be executed when the computer 3–6, 16 and/or 18 is activated.

When the computer 3–6, 16 and/or 18 is in operation, the processor 21 is configured to execute software stored within the memory 22, to communicate data to and from the memory 22, and to generally control operations of the computer 3–6, 16 and/or 18 pursuant to the software. The remote link processing system 60 and the O/S 32 are read, in whole or in part, by the processor 21, perhaps buffered within the processor 21, and then executed.

When the processing engine 100 in the remote link processing system 60 is implemented in software, as is shown in FIG. 2, it should be noted that the remote link processing system 60 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The remote link processing system 60 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

The local processing engine directory 120 may be any type of application program or, in the alternative, may be a database. The local processing engine directory 120 as a database includes, but is not limited to, VCM, Oracle, CISAM, sequential files type databases, any ODBC compliant database, CGI library or total databases.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the remote link processing system 60 is implemented in hardware, the remote link processing system 60 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
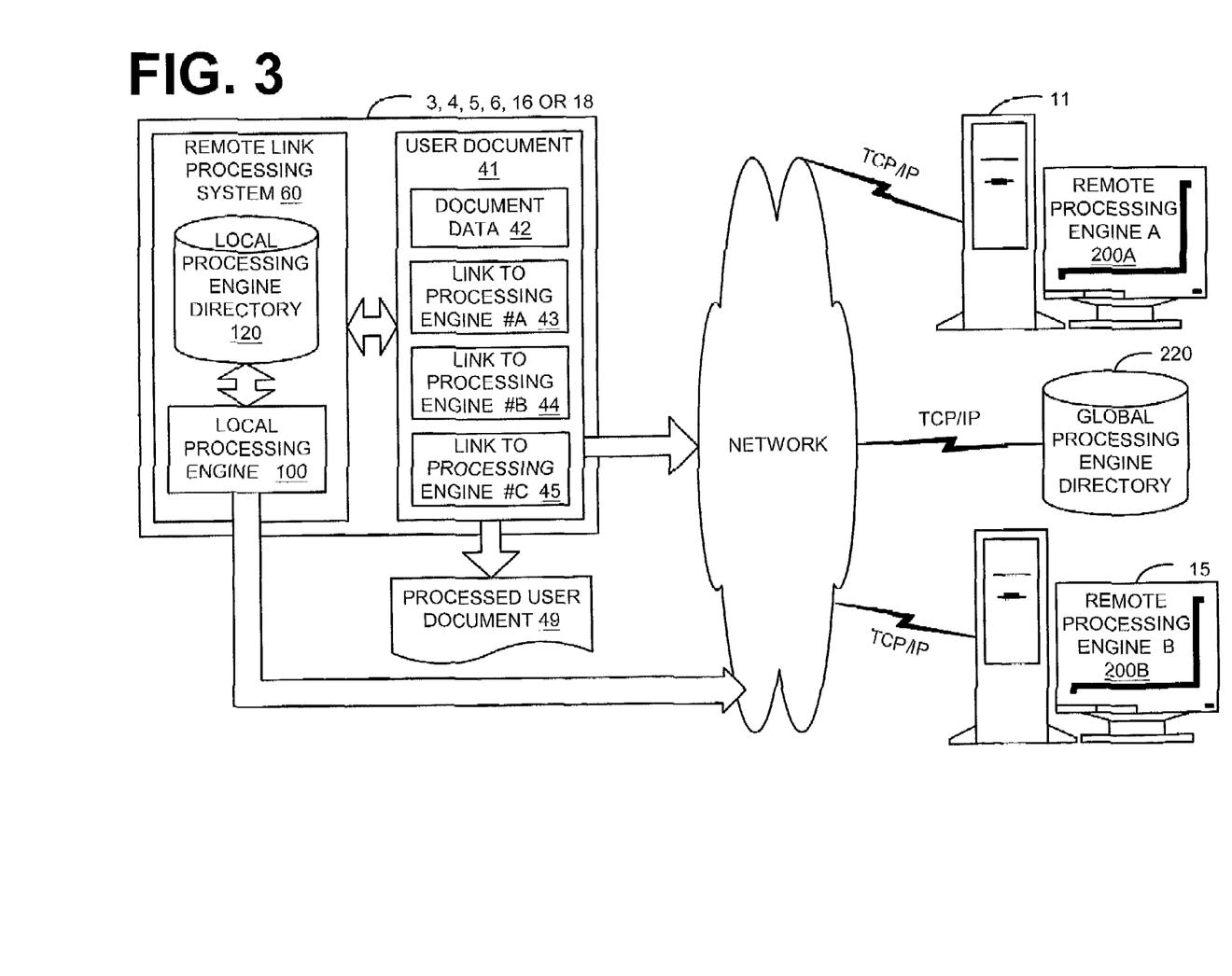
FIG. 3 is a data flow diagram illustrating an example of the process flow of the remote link processing system of the present invention as shown in FIG. 2.

FIG. 3 is a data flow diagram illustrating an example of the process flow of the remote link processing system 60 of the present invention. The remote link processing system 60 includes a processing engine 100 and a processing engine directory 120. The remote link processing system 60 provides the ability to process references (embedded in documents) to remote processing routines that can operate on the document.

The remote link processing system 60 allows extendable operations to be added to the flow of processing on a document with the executable or processing code being able to exist remotely in a distributed manner, and not necessarily on the same physical computer as the document itself. These distributed processing engines (i.e. global processing engines 220) could be located in the same enterprise as the document, or another remote location across a global network such as the Internet. This enables the user to specify a processing reference within a document to allow that document to point to remote services for processing that document. This can include image processing, job accounting, notification of results, table processing, hidden code processing, and the like. This further provides the ability to have an easily maintainable technique for providing uniform function processing of documents by allowing multiple documents in multiple locations to access a remote service engine to provide the required service processing for each document. A brief description of the system flow is set forth below.

As seen in FIG. 3, the remote link processing system 60, including the processing engine 100 and processing engine directory 120, resides in the computer 3–6, 16 or 18. Also within the computer 3–6, 16 or 18 is a user document 41. Within the user document 41 definition there includes the document data 42. This document data 42 may include text, table, image, or other data. Also included in the user document 41 are one or more processing links 43, 44 and 45 to remote processing engines. Upon performance of the processing by the indicated processing engines, the computer 3–6, 16 or 18 then generates the processed user document 49. The links 43–45 to processing engines may be references or pointers over a network to local processing engines 100 or remote processing engines 200. These local processing engines 100 and remote processing engines 200 may reside in computer 3–6, 16 or 18, the remote server 11 and the remote server 15. The processing engine links 43, 44 and 45 shown in the user document are illustrated for example purposes only. It should be appreciated, however, that there could be multiple links to local processing engines 100 and/or remote processing engines 200 that may reside anywhere on a network.

The computer 3–6, 16 or 18 contains document contents and links to local and remote processing engines. The local and remote processing engines enable the user to select what processing is to occur on the document that the remote processing is to be performed on. Examples of these processing types performed on the document 41 include, but are not limited to, formatting the contents for the Web, removing red-eye from a photograph, delivery of content via e-mail, extracting key words from the content to add to a database, or the like.

The local processing engine directory 120 and global processing engine directory 220 provide a list of processing engines that are available in the remote links processing document data system 60 of the present invention. The local processing engine directory 120 and global processing engine directory 220 may store a series of entries, each of which may contain, but is not limited to, a user readable name, reference to the local or remote processing engine, the document and the document types that the processing engine may operate on.

As stated before, there can be multiple links within a user document 41 to both local processing engines 100 and remote processing engines 200. The location of the processing engine that performs the selected processing on the user document 41 is transparent to the user so that the user does not need to know where these processing engines are located. The local processing engine directory 120 and global processing engine directory 220 are directories that may track all the processing engines in the system to provide processing of the user document 41.

The user document 41 contains both the document data and processing links that point to or specify processing engines. The processing engine links 43–45 are references to external processing engines. The processing engine links can be in the form of a URL that describes the path to submit the document to for remote processing. Each processing engine could potentially use a different format for passing additional parameters to the processing engine. One example includes, but is not limited to, keywords extractor: http:// at the location extractor.docservices.com/heading. This path represents a command to extract the heading out of the document. The remote processing engine links 43–45 are preferably self-contained entities that have a specific link format and provide a specific set of functionality for document content. Processed user document 49 denotes a resultant user document after all the processing engines have been invoked to perform their processing.

Figure 4A:
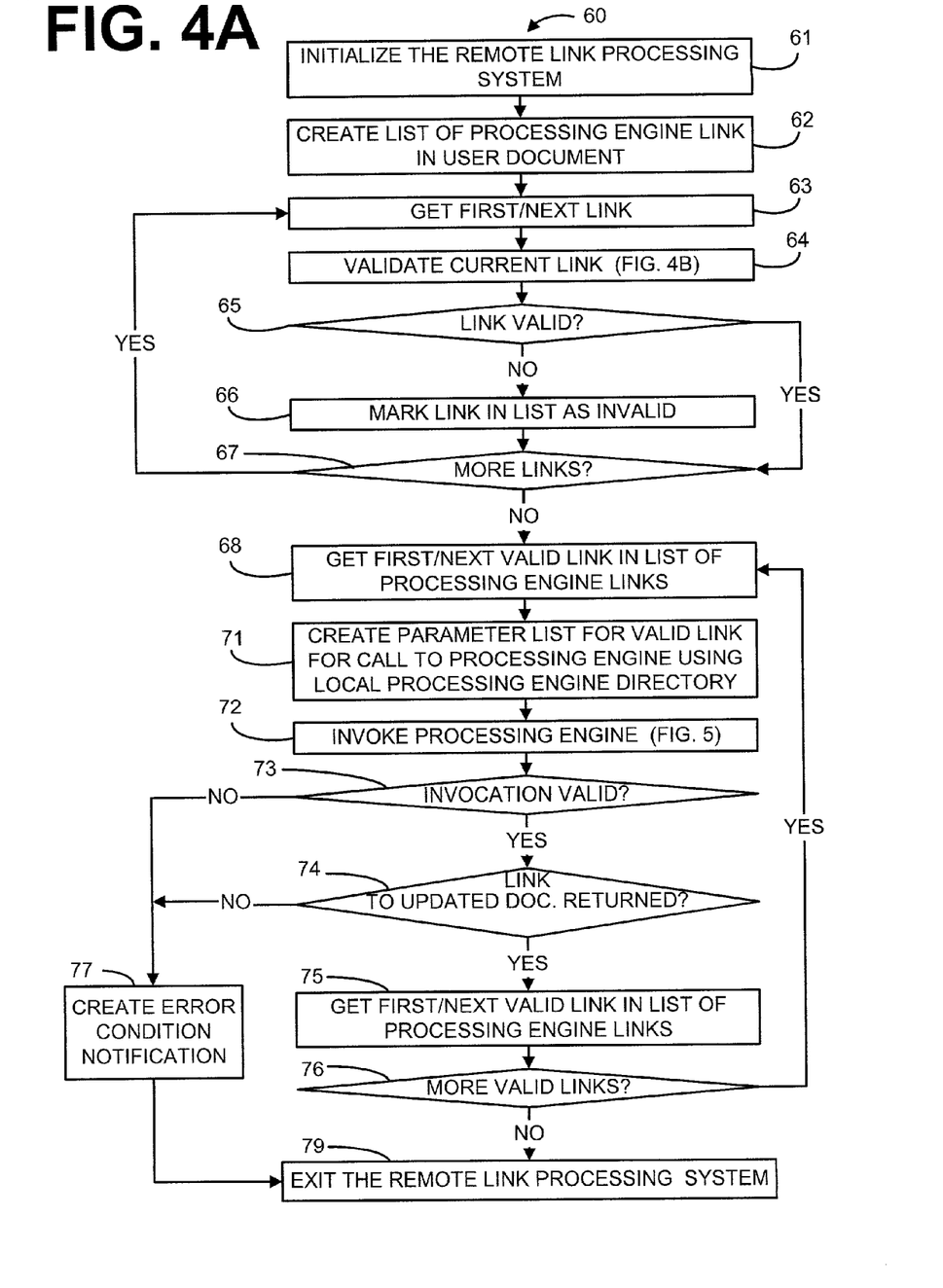
FIG. 4A is a flow chart illustrating an example of the process steps of the remote link processing system of the present invention, as shown in FIG. 2 and FIG. 3.

FIG. 4A is a flow chart illustrating an example of the steps of the remote link processing system 60 of the present invention. The remote link processing system 60 of the present invention provides the ability to include references in documents to external processing routines that can operate on the document. This enables extendable operations to be added to the flow of processing on a document 41 with code able to exist remotely and in a distributed manner.

First, the remote link processing system 60 is initialized at step 61. At step 62, a list of processing engine links in the user document is created. At step 63, the remote link processing system 60 acquires the first processing link in the list of processing engine links. At step 64, the remote link processing system 60 then validates the current link and determines whether the link is valid at step 65. The validate current link process 80 is herein defined in further detail with regard to FIG. 4B.

If it is determined at step 65 that the current link is valid, the remote link processing system 60 then proceeds to step 67 to determine whether there are more links in the list of processing engine links to be processed. However, if it is determined at step 65 that the current link is not valid, the remote link processing system 60 then may mark the current link in the list as invalid at step 66. At step 67, the remote link processing system 60 then determines whether there are more links to be processed in the list of processing engine links. If it is determined at step 67 that there are more links to be processed in the list of processing engine links in the user document, the remote link processing system 60 returns to repeat steps 63–67.

However, if is determined at step 67 that there are no more links to be processed in the list of processing engine links in the user document 41, the remote link processing system 60 then gets the first valid link in the list of processing engine links at step 68. At step 71, the remote link processing system 60 then creates a parameter list for the current valid link from the data in the local processing engine directory 120, for a call to the appropriate local processing engine 100 or remote processing engine 200. The appropriate processing engine may be either a local processing engine 100 or remote processing engine 200. At step 72, the remote link processing system 60 then invokes the appropriate local processing engine 100 or remote processing engine 200. The operation of the local processing engine 100 or the remote processing engine 200 is herein defined in further detail with regard to FIG. 5.

After invoking the appropriate local processing engine 100 or remote processing engine 200 at step 72, the remote link processing system 60 then determines whether the link to the appropriate local processing engine 100 or remote processing engine 200 invoked at step 72 is valid. If it is determined at step 73 that the invoked link at step 72 is not valid, the remote link processing system 60 then creates an error condition notification at step 77 and exits at step 79.

However, if it determined at step 73 that the appropriate local processing engine 100 or remote processing engine 200 invoked link at step 72 is valid, the remote link processing system 60 then determines whether the link to the updated document was returned at step 74. If it is determined at step 74 that the link to the updated document was not returned, the remote link processing system 60 then creates an error condition notification at step 77 and exits at step 79.

However, if it is determined at step 74 that the link to the updated document was returned at step 74, the remote link processing system 60 then gets the next valid link in the list of processing engine links at step 75. At step 76, the remote link processing system 60 determines whether there are more valid links to be processed. If it is determined at step 76 that there are more valid links ton be processed, the remote link processing system 60 then returns to repeat steps 71–76. However, if it is determined at step 76 that there are not more valid links, the remote link processing system 60 then exits at step 79.

Figure 4B:
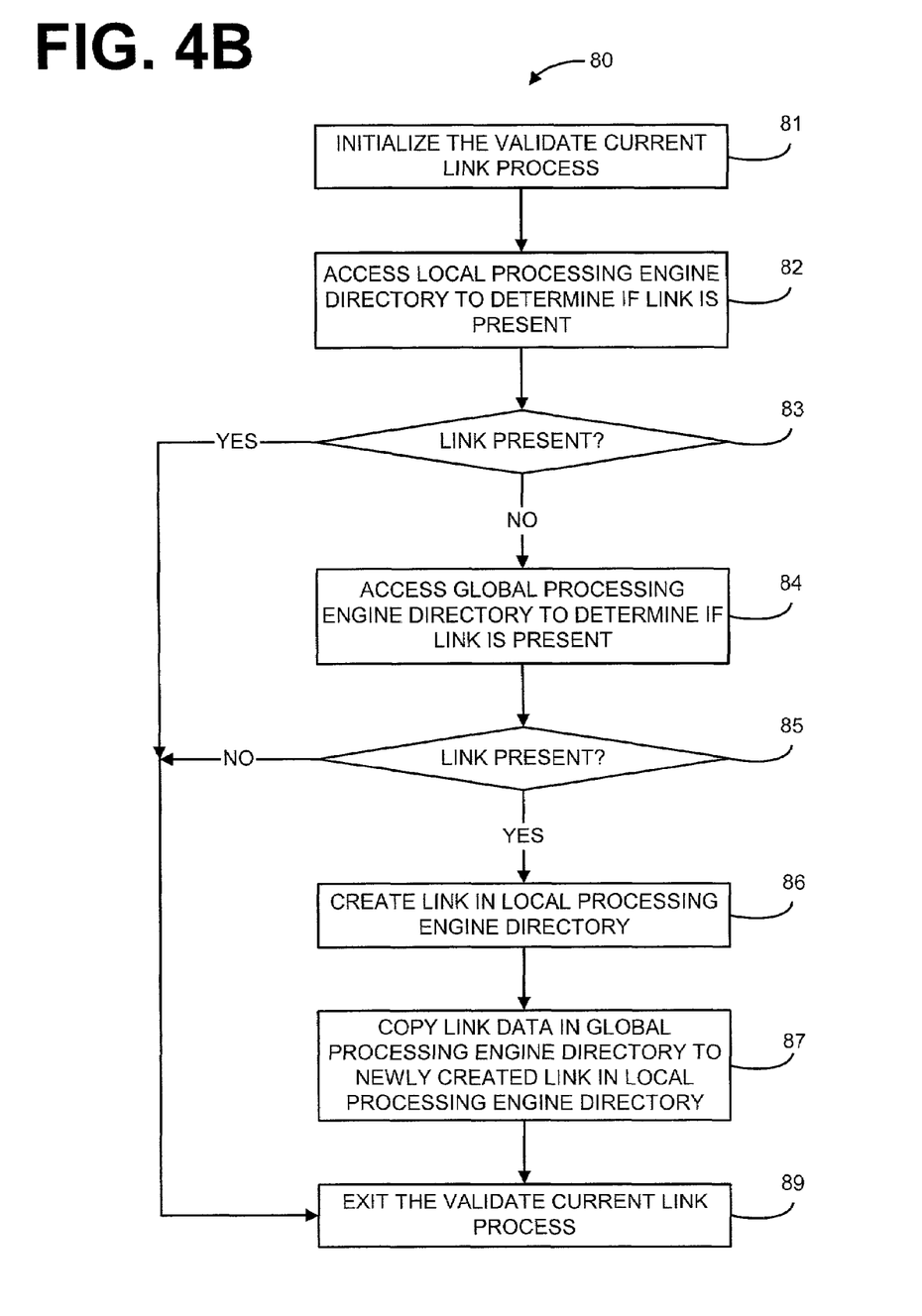
FIG. 4B is a flow chart illustrating an example of the process steps of the validate current link process for the remote link processing system of the present invention, as shown in FIG. 4A.

FIG. 4B is a flow chart illustrating an example of the process steps of the validate link process 80 for the remote link processing system 60 of the present invention, as shown in FIG. 4A. First, the validate current link process 80 is initialized at step 81. At step 82, the validate current link process accesses the local processing engine directory 120 to determine whether the current link is present in the local processing engine directory 120. If it is determined at step 83 that the current link is present in the local processing engine directory 120, the validate current link process 80 then skips to step 89 and exits the validate current link process 80.

However, if it is determined at step 83 that the current link is not present in the local processing engine directory 120, then the validate current link process 80 then accesses the global processing engine directory 220 to determine if the link is present in the global processing engine directory 220 at step 84. At step 85, the validate current link process 80 then determines whether the current link is present in the global processing engine directory 220. If it is determined that the current link is not present in the global processing engine directory 220, the validate current link process 80 then skips to step 89 and exits the validate current link process 80.

However, if it is determined at step 85 that the current link is present in the global processing engine directory 220, the validate current link process 80 then creates a link in the local processing engine directory 120 at step 86. At step 87, the validate current link process 80 then copies the link data in the global processing engine directory 220 to the newly created link in the local processing engine directory 120. The validate current link process then exits at step 89.

Figure 5:
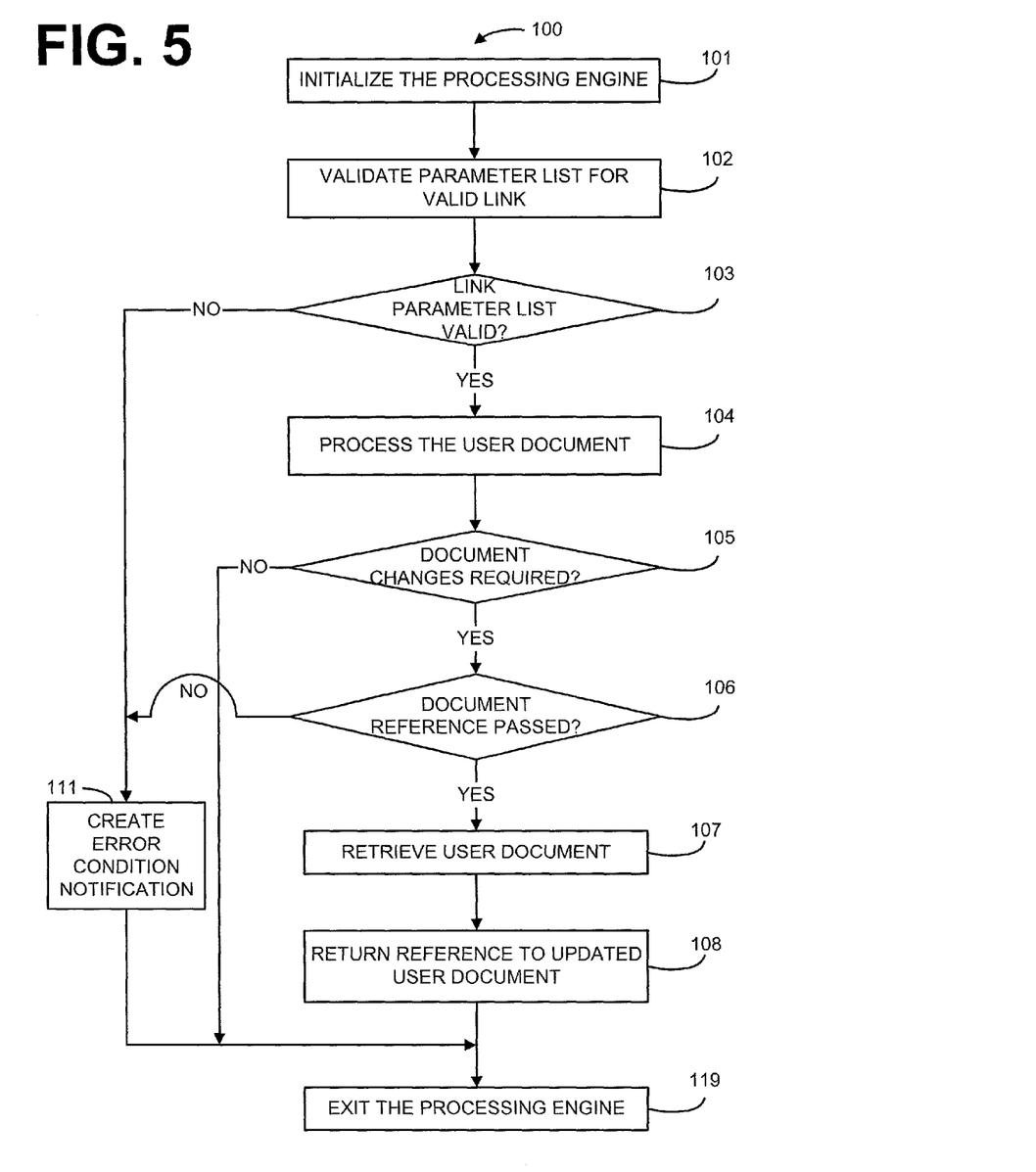
FIG. 5 is a flow chart illustrating an example of the processing engine of the present invention, as shown in FIG. 4.

Illustrated in FIG. 5 is a flow chart illustrating an example of the local processing engine 100 or remote processing engine 200 for the remote link processing system 60 of the present invention. The following example operation of the processing engine 100 also illustrates the operation of the remote processing engine 200, and any reference to the operation of the local processing engine 100 also applies to the remote processing engine 200.

First, the local processing engine 100 is initialized at step 101. At step 102, the processing engine 100 then validates the parameter list for the valid link received during the processing engine's invocation. At step 103, the processing engine 100 determines whether the link parameter list is valid. If it is determined at step 103 that the link parameter list is not valid, the processing engine 100 then proceeds to step 111 to create an error condition notification, and then exits at step 119. However, if it is determined at step 103 that the link parameter list received during invocation is valid, the processing engine 100 then processes the user document at step 104.

At step 105, the processing engine 100 then determines whether document changes are required. If it is determined at step 105 that document changes are not required, the processing engine 100 then skips to step 119 to exit the processing engine. However, if it is determined at step 105 that the document changes are required, the processing engine 100 then determines whether the document references have been passed.

If it is determined at step 106 that the document references have not been passed during the invocation of the processing engine 100, the processing engine 100 then proceeds to step 111 to create an error condition notification, and then exits at step 119. However, if it determined at step 106 that the document references were passed during invocation, the processing engine 100 then retrieves the user document at step 107. At step 108, the processing engine 100 then returns the reference to the updated user document and then exits at step 119.

The foregoing description has been presented for purposes of illustration and description. It is not intended to be exhaustive or to limit the invention to the precise forms disclosed. Obvious modifications or variations are possible in light of the above teachings.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for processing a document by external processing routines that operate on the document in response to reference links embedded within the document, comprising:
   means for acquiring a processing link in the document;
   means for using said processing link to invoke a processing engine to modify the document;
   means for modifying said document by said processing engine;
   means for invoking said processing engine using a data list;
   means for accessing a local directory to create said data list for said processing link; and
   means for accessing a global directory to create said data list for said processing link, if said data list for said processing link is not located in said local directory.

2. The system of claim 1, further comprising:
   means for validating said processing link using said local directory and said global directory.

3. The system of claim 1, wherein said global directory accessing means further comprises:
   means for copying said data list for said processing link from said global directory to said local directory if said global directory is used to create said data list.

4. A method for processing a document by external processing routines that operate on the document in response to reference links embedded within the document, said method comprising:
   acquiring a processing link embedded in the document;
   using said processing link to invoke a processing engine to modify the document;
   modifying said document by said processing engine;
   using a data list to invoke said processing engine;
   accessing a local directory to create said data list for said processing link; and
   accessing a global directory to create said data list for said processing link if said data list for said processing link is not located in said local directory.

5. The method of claim 4, further comprising:
   validating said processing link using said local directory and said global directory.

6. The method of claim 4, further comprising:
   copying said data list for said processing link from said global directory to said local directory if said global directory is used to create said data list.

7. A computer readable medium having stored thereon computer readable instructions for processing a document by external processing routines that operate on the document in response to reference links embedded within the document, comprising:
   logic for acquiring a processing link in the document;
   logic for using said processing link to invoke a processing engine to modify the document;
   logic for modifying said document by said processing engine;
   logic for using a data list to invoke said processing engine;
   logic for accessing a local directory to create said data list for said processing link; and
   logic for accessing a global directory to create said data list for said processing link if said data list for said processing link is not located in said local directory.

8. The computer readable medium of claim 7, further comprising:
   logic for validating said processing link using said local directory and said global directory.

9. The computer readable medium of claim 7, wherein said logic for accessing said global directory further comprises:
   logic for copying said data list for said processing link from said global directory to said local directory if said global directory is used to create said data list.

10. A system for processing a document by external processing routines that operate on the document in response to reference links embedded within the document, comprising:
    a processing link identifier that identifies a document containing at least one processing link to an external processing routine;
    an invoker operative to use a data list to invoke a processing engine to modify said document;
    a local directory lookup that accesses a local directory to create said data list for said processing link; and
    a global directory lookup that accesses a global directory to create said data list for said processing link if said data list for said processing link is not located in said local directory;
    wherein said processing engine modifies said document using said external processing routine.

11. The system of claim 10, wherein said invoker further comprises:
    a validator that validates said processing link.

12. The system of claim 10, wherein said global directory lookup further comprises:
    a data list generator that copies said data list for said processing link from said global directory to said local directory if said global directory is used to create said data list.

* * * * *